Feb. 14, 1956  N. N. EPSTEIN  2,735,013
MULTIPLE FREQUENCY GENERATOR
Filed Sept. 28, 1953
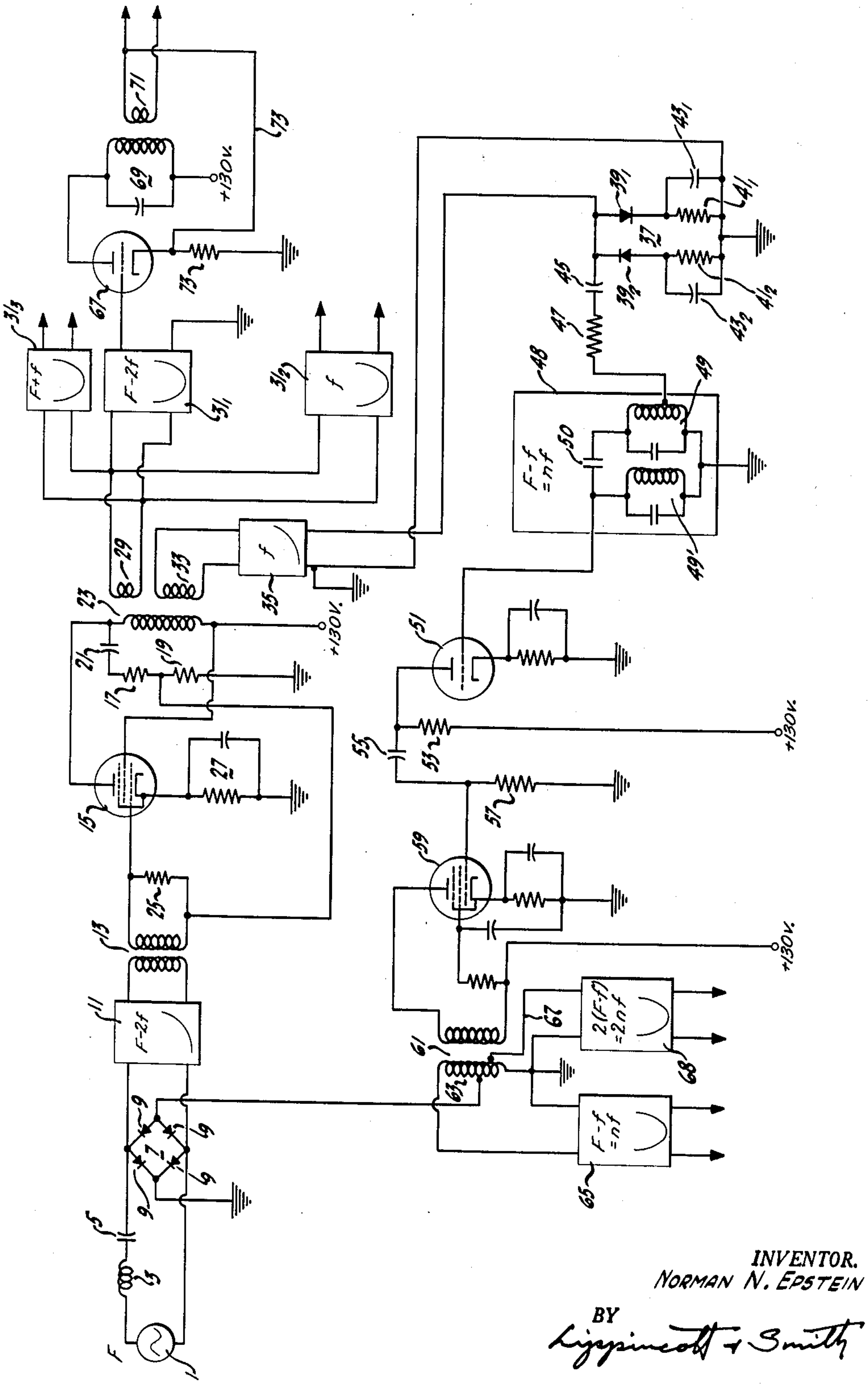
INVENTOR.
NORMAN N. EPSTEIN
BY
Lippincott + Smith
ATTORNEYS United States Patent Office 2,735,013
Patented Feb. 14, 1956

2,735,013

MULTIPLE FREQUENCY GENERATOR

Norman N. Epstein, Redwood City, Calif., assignor to Lenkurt Electric Co., Inc., San Carlos, Calif., a corporation of Delaware Application September 28, 1953, Serial No. 382,690

8 Claims. (Cl. 250—36)

This invention relates to apparatus for obtaining a plurality of electrical waves of definitely related frequencies from a single stable source, the frequencies developed being separated by equal numbers of cycles corresponding to the frequency of a sub-harmonic of the original stable or reference frequency or to integral multiples of such sub-harmonic frequency. The device is designed primarily for supplying carrier frequencies for a large number of voice channels, but is not limited to this use since it can be adapted for any duty wherein electrical waves bearing frequency relationships of the type mentioned are required.

It has been known that it is possible to feed a modulator circuit with a reference or carrier frequency, take a portion of its output and pass it through a filter which will select a sub-harmonic, amplify the sub-harmonic and modulate it upon the supplied carrier to produce a desired frequency. The difficulty with equipment of this character has been to attain equipment which is stable and positive in operation. It has always been necessary to supply some sort of shock-excitation to the circuit to obtain the initial production of the sub-harmonic in order to get the operation started, although, once started, the desired frequencies will build up to a usable value. If, however, operation ceases through failure of any part of the circuits, the development of the desired frequency may cease entirely since the action is not usually self-starting.

The present invention utilizes certain of the same principles as those in the prior type of apparatus described. Among the objects of the invention are to provide means for developing a large number of related frequencies, separated by uniform numbers of cycles, to provide such apparatus which is stable in operation and is self starting; to provide apparatus of the character described wherein all of the frequencies desired are produced unfailingly and bear their exact desired relationship; and to provide apparatus which is simple to maintain, uses standard and readily available components, is compact and is easy to maintain.

In accordance with the present invention the original reference frequency is supplied to a modulator, which may be a balanced rectifier-bridge type. The modulator connects to an amplifier having a plurality of output circuits. Certain of these circuts connect to filters selective of the plurality of frequencies desired. One of them, however, is selective of the sub-harmonic frequency by which the other frequencies are separated. This latter circuit is of high impedance and feeds a wave-distorting network adapted to develop harmonics of the sub-harmonic frequency. From the wave-distorting network the circuit connects through a high impedance filter which supplies a high gain amplifier. The output circuit of the latter couples back to the modulator, to feed back to the modulator the harmonic selected by the high impedance filter in the loop circuit, this harmonic being so chosen that it differs from the original frequency by the constant separation between the frequencies to be developed.

The various advantages of this arrangement will best be understood from the detailed description of a preferred embodiment which follows.

The single figure of the drawing is a circuit diagram, partly schematic and partly in block form, illustrative of one embodiment of the invention.

In the drawing a source 1 represents any stable source of oscillations of a reference frequency F. For the present it may be considered to be an accurately crystal-controlled master oscillator, but as the device is actually used in practice it may also be one of the output circuits of a similar system, the frequency of which is to be stepped-down (or up) to provide a plurality of carrier frequencies in a different range. The invention will be first described however, on the assumption that the oscillator operates on one of the frequencies which is desired as a carrier and for the purpose of illustration this frequency F will be taken as 96 kilocycles.

The output of the source 1 is fed through a sharply tuned series-resonant circuit comprising an inductor 3 and condenser 5, to a modulator 7. The series-resonant circuit tends to prevent the oscillator from loading the modulator at the derived frequencies. It is therefore a desirable but not a necessary element of the equipment. The modulator 7 is of the balanced shunt type, wherein the output modulation products appear at the same terminals as the 96 kc. input frequency, and hence are available to develop higher-order modulation products, resulting in more closely-spaced output frequencies than would be available from a double-balanced modulator. Other modulator configurations can be used, but in general the single-balanced types are preferable to the double-balanced types for the purposes of the present invention, although for certain frequency relationships the latter can be used. The modulator shown comprises four contact-type rectifiers 9 connected to block conduction in either direction across one diagonal of the bridge and conduct in one direction only across the other diagonal, but other known configurations can be used. The input and output circuits are both connected across the non-conductive diagonal of the rectifier bridge.

In this particular instance the modulator output circuit connects through a low-pass filter 11 which is adapted to pass modulation products of 64 kc. and below, since the frequencies desired in addition to the original 96 kc. reference frequency are 80 kc., and 64 kc. which differ from the reference frequency by integral multiples of the sub-harmonic frequency *f*, in the example 16 kc. As will be shown, the 80 kc. frequency is developed elsewhere in the circuit, and it is not necessary that it be passed by filter 11. Although in this particular application of the device the filter 11 is desirable and improves the operation it is not necessary and the device has been constructed (and will be hereinafter described) in a modified form wherein even the carrier frequency may be derived from the output and frequencies both below and above the reference frequency are similarly developed.

From the filter 11 the circuit connects to an input transformer 13, which drives an amplifier pentode 15. As is usual the transformer 13 is of the step-up type. One side of its secondary winding is connected to the control grid of the pentode. The other end of the transformer secondary connects to a resistive voltage-divider network comprising resistors 17 and 19. The voltage divider connects, through a blocking condenser 21, across the primary 23 of an output transformer which connects from an anode of tube 15 to a conventional anode supply (not shown). The voltage divider network connects to ground, and the lead from its midpoint to the low voltage end of the secondary of transformer 13 provides negative feedback for stabilizing the tube 15. A terminating resistor 25 connects across the secondary of transformer 13, and the usual biasing circuit 27 is provided for the tube 15.

Two secondaries are coupled to the primary coil 23 of the output transformer. Secondary 29 is a low impedance winding and feeds a plurality of branch circuits—as many as may be required to provide the desired number of derived frequencies. Each of these circuits includes a narrow band-pass filter, these filters being designated as $31_1$, $31_2$, and $31_3$. In the case of the apparatus used to supply the carriers of 96, 80, and 64 kc., only filter $31_1$, passing the component $F-2f$, is necessary. In the particular apparatus described, however, a 16 kc. frequency is also desired to feed another device of the same general character and so provide a group of sub-carriers, and hence the filter $31_2$ passing the sub-harmonic frequency $f$ is also shown. A filter $31_3$ will select a frequency $F+f$ if such a frequency is desired.

The other secondary coil 33 is of relatively high impedance. This second coil connects through a low pass filter 35, which has a cut-off sufficiently high to pass the 16 kilocycle sub-harmonic frequency $f$ of the 96 kc. reference frequency which marks the difference in frequency between the various carriers which it is desired to develop. The output of filter 35 connects to a wave distorting network generally designated by the reference character 37. Various known types of such distorting networks may be used in this position. The one shown is adapted to develop the odd harmonics of the 16 kc. frequency passed by the filter 35. It comprises a pair of oppositely directed rectifiers $39_1$ and $39_2$ connected to the high tension lead of the filter output. In series with these rectifiers are resistors $41_1$ and $41_2$ respectively. Each bridged by a small condenser $43_1$ and $43_2$. The midpoint between resistors $41_1$ and $41_2$ is grounded. As a result of this connection the output waveform from the filter 35 is substantially rectangular and hence contains a large component of fifth harmonic. If the desired output frequencies are related to the reference frequency by an even harmonic the distorting network would have a different configuration, but that shown has proved satisfactory for the frequency relationships here desired.

From the distorting network the circuit couples through a condenser 45 and series resistance 47 with a band-pass filter 48 comprising a pair of parallel-resonant circuits 49, 49′, coupled at the top through a small condenser 50 and grounded at the bottom. The lead from resistor 47 couples to a low-impedance point on the resonant-circuit 49. The top of circuit 49′ connects to the control electrode of an amplifier tube 51, the filter thus having a very high impedance when viewed from tube 51 as compared with its impedance as viewed from its input. The filter selects and passes the 80 kc. fifth harmonic ($nf$ where $n$—5) developed by the distorting network to the control electrode of an amplifier tube 51.

Tube 51 is connected by a resistance-capacity coupling comprising a plate-feed resistor 53, a coupling condenser 55 and a grid resistor 57 to the control electrode of a second amplifier tube 59. In the apparatus described tube 59 is a pentode and is supplied with the bias voltages for its various electrodes in an entirely conventional manner, shown but unnecessary to describe in detail.

The output circuit for tube 59 is a transformer 61, having a tapped secondary 63. One terminal of the secondary is grounded. The entire secondary coil is used to feed an 80 kc. band-pass filter 65, from which the desired 80 kc. carrier is withdrawn. A low-voltage tap on the secondary 63 connects through the bridge modulator 7 back to ground, the connection being made across the opposite diagonal of the bridge to that connecting to the input and output modulator circuits.

The various filters $31_1$, $31_2$ etc. each feed conventional tuned amplifiers, only one of which is shown in the drawing, i. e., that supplied by filter $31_1$. The grid of an amplifier tube 67 connects directly to the filter. The anode connects through a resonant circuit 69, tuned to the filter frequency (in this case 64 kc.) which couples to an output circuit including a secondary coil 71. A feedback connection 73 connects from the high side of coil 71 to the cathode of tube 67 and thence to ground through a feedback and bias resistor 73, thus to produce a stabilizing negative feedback.

A highly important feature of the invention lies in the impedance relationships in the loop circuit between secondary coil 33 and the modulator. The amplifier comprising tubes 51 and 59 is a high-gain device and the grid circuit of tube 51 is of high impedance at the frequency passed by the filter. In the absence of a positive drive voltage on the grid the thermal noise developed in its high impedance input circuit is amplified and fed to the modulator, but because of the sharp tuning of the filter 48 the dominant component in the noise so generated is the center-frequency of the filter. This is modulated on the reference frequency to produce the 16 kc. frequency, originally at a very low level. The 16 kc. component is fed through filter 35 to the distorting network 37, and the latter, with its coupling to filter 48, offers a good impedance match to the input side of the circuit. Therefore, although network 37 is not as effective to produce distortion as it is at higher output levels, it does provide an 80 kc. component to build up the output of filter 48, the process increasing regeneratively until full output is reached.

The output does not increase indefinitely owing to the non-linear components in the circuit. The gain around the loop is such that tube 59 is driven to saturation at full output of the device, and approach to this condition first limits the amplitude. The distorting network also changes in impedance with increasing amplitude, and by creating a mismatch tends to act as a limiter.

The operation of the apparatus is therefore self-starting, with all of the advantages that this fact implies. It is not necessary to apply repeated shocks to the circuit, by opening and closing the anode supply to tube 15 for example, until one closure happens to start the operation. The generation of the various carrier frequencies starts unfailingly as soon as the tubes are in an operating state.

The production of the 16 kc. frequency from the intermodulation of the 96 kc. carrier and the 80 kc. modulating frequency is straightforward. What is not so evident upon inspection of the circuit is the fact that the 16 kc. frequency appears across the modulator input-output terminals at a fairly high level and is itself available for modulation upon the 80 kc. as a carrier to produce the difference frequency of 64 kc. ($F-2f$) as a third order modulation product. The 64 kc. component is therefore amplified by tube 15 and delivered to filter $31_1$ for further amplification and use.

The apparatus as thus described is used in practice as a source of carrier frequencies upon each of which a group of sub-carriers is modulated, each group of sub-carriers including four voice channels, nominally 4 kc. wide. The system as a whole is described in the copending application of Robert S. Caruthers, Serial No. 382,689, filed September 23, 1953. In accordance with the system there described, sub-carrier frequencies of 8, 12, 16, 20 and 24 kc. are desired, the various voice frequency channels being modulated upon either the group from 8 to 20 kc. or from 12 to 24 kc., depending upon whether upper or lower sideband modulation, producing either erect or inverted sidebands for transmission, are desired.

In order to produce the sub-carrier frequencies substantially the same arrangement of equipment is used as that described in deriving the three higher frequency carriers by the equipment already discussed. In place of the crystal oscillator used as the source 1, however, this source is replaced by the 16 kc. output of filter $31_2$.

As far as the production of the modulating frequency is concerned, the lower frequency equipment contains all of the elements that have been described with the exception of the filter 11. The differences, of course, are that filter 35 has a cut-off frequency *f* of 4 kc. instead of 16 kc. and the filter 48 passes a narrow band centering on a frequency *nf* of 12 kc. instead of 80 kc., selecting the third instead of the fifth harmonic from the substantially square wave produced by the distorting circuit 37. The filter 31 selects the 4 kc. frequency *f*, whereas filter $31_1$ selects 8 kc., which is $F-2f$ as before.

Filter $31_3$, however, selects the upper sideband $F+f$ resulting from the intermodulation of the 16 kc. reference frequency and the 4 kc. modulation component developed in the apparatus to produce a 20 kc. subcarrier.

As has been noted before, the 16 and 12 kc. components are present in the output of the tube 15, but it is more convenient to derive them from other portions of the circuit. The 12 kc. frequency $nf=F-f$ is selected by filter 65, since it corresponds in the lower range to the 80 kc. frequency in the higher range. The only substantial addition to the circuit as used to supply the carrier frequencies in the higher range is that used to derive the 24 kc. subcarrier. The 24 kc. corresponds to $F+2f$, and a component of this frequency is available in the output of coil 33 and could be derived therefrom together with the frequency $F-2f$ which is so derived. In this case $F+2f=2nf$. The frequency $nf=12$ kc. is that fed to the modulator 7 and to the effective source of this frequency the modulator appears as a half-wave rectifier. Accordingly there is in the portion of the coil 63 which supplies the modulator a component of frequency $2nf$ as well as *nf* and D. C. components.

A lead 67 connects to a tap on coil 63 between the modulator and ground, and connects to a low-impedance-input filter 68 which selects the $2nf$ or 24 kc. frequency. The impedance relationships are such as to accentuate the 24 kc. component to a sufficient degree without affecting the other components desired unduly.

Although specific frequencies have been mentioned as effective in the various portions of the circuitry described herein and as used in different applications of the invention it should be evident from the general notation also employed that these frequencies are mentioned solely for the purpose of explanation. Other frequencies can be developed than those having the relationships shown. Among such frequencies are $2F\pm f$ and $2F\pm nf$. Generally it is preferable so to relate the reference frequency to the others to be developed as to make the desired derived frequencies correspond to modulation products of as low order as possible. Obviously it is also desirable to withdraw these products from the circuit at the locality therein where the product withdrawn appears at highest amplitude. It will be evident to those skilled in the art that the number of combinations of frequencies that can be produced in accordance with the invention is very large and that of the number of frequencies available any number may be selected.

It should also be evident that the frequencies developed are positively locked in to the reference frequency through the relationship $F=(n+1)f$. Percentage-wise the frequencies produced are exactly as stable as the reference frequency, and there need be no "jitter" in the phase of the sub-frequencies as can be the case when counter-type dividers are used.

What is claimed is as follows:

1. A multiple frequency generator for developing a plurality of stable frequency outputs each spaced from a single reference frequency comprising input terminals whereat a source of reference frequency waves is adapted to be connected, a single-balanced modulator having one input circuit connected to said terminals and including a second input and an output circuit, a plurality of load circuits coupled to said output circuit, frequency selective means connected in each of said load circuits, said frequency selective means being selective of frequencies differing by integral multiples of a subharmonic of said reference frequency and one of said frequency selective means being selective of said subharmonic frequency, wave-distorting means coupled to draw energy from the load circuit including said subharmonic selective means, a circuit fed by said wave-distorting means optimally responsive to a harmonic of said subharmonic frequency which differs from said reference frequency by an amount equal to said subharmonic frequency, means for increasing the amplitude level of the said harmonic and connections from the last mentioned circuit to the second input circuit of said modulator.

2. A multiple-frequency generator for developing from a constant frequency source a plurality of spaced frequencies all of which are harmonics of a subharmonic of the frequency of said source, comprising a modulator having terminals adapted for connection to said source, an amplifier connected to the output circuit of said modulator and adapted to pass a band of frequencies including said desired frequencies and the frequency of said subharmonic, a plurality of output circuits for said amplifier each including a band-pass filter for selecting a single one of said spaced frequencies, an additional output circuit for said amplifier and a filter in said additional circuit for selecting said subharmonic frequency, wave-distorting means connected to said last-mentioned filter for developing a harmonic component of said subharmonic frequency differing from the frequency of said source by said subharmonic frequency, a filter connected to select said harmonic component, and connections from said filter to said modulator for intermodulating said source frequency with said harmonic component frequency.

3. Means for developing from an electrical wave of a reference frequency waves of a plurality of desired frequencies which differ from said reference frequency by integral multiples of a subharmonic thereof, comprising a modulator adapted for the connection of two input circuits and unbalanced with respect to at least one of said input circuits, terminals for connecting a source of reference frequency waves to a first of said input circuits, an output circuit for said modulator, a loop circuit from said output circuit back to the second of said input circuits, a filter in said loop circuit selective of said subharmonic frequency, a distorting network in said loop circuit following said filter for developing a harmonic of said subharmonic frequency differing from said reference frequency by said subharmonic frequency, a filter in said loop circuit following said distorting network for selecting said harmonic frequency and having an output impedance which is high at said harmonic frequency, a high-gain amplifier in said loop circuit between said last mentioned filter and said modulator, and a plurality of frequency-selective circuits coupled to the output circuit of said modulator and selective of said desired frequencies.

4. Means for developing from an electrical wave of a reference frequency waves of a plurality of desired frequencies which differ from said reference frequency by integral multiples of a subharmonic thereof, comprising a modulator adapted for the connection of two input circuits and unbalanced with respect to at least one of said input circuits, terminals for connecting a source of reference frequency wakes to a first of said input circuits, an output circuit for said modulator, a loop circuit from said output circuit back to the second of said input circuits, a filter in said loop circuit selective of said subharmonic frequency, a distorting network in said loop circuit following said filter for developing a harmonic of said subharmonic frequency differing from said reference frequency by said subharmonic frequency, a filter in said loop circuit following said distorting network for selecting said harmonic frequency and having an output impedance which is high at said harmonic frequency, a high-gain amplifier in said loop circuit between said last mentioned filter and said modulator, and frequency selective output circuits coupled respectively to said modulator output circuit and the second of said modulator input circuits said selective of different ones of said desired frequencies.

5. Means for developing from an electrical wave of a reference frequency waves of a plurality of desired frequencies which differ from said reference frequency by integral multiples of a subharmonic thereof, comprising a modulator adapted for the connection of two input circuits and unbalanced with respect to at least one of said input circuits, terminals for connecting a source of reference frequency waves to a first of said input circuits, an output circuit for said modulator, a loop circuit from said output circuit back to the second of said input circuits, a filter in said loop circuit selective of said subharmonic frequency, a distorting network in said loop circuit following said filter for developing a harmonic of said subharmonic frequency differing from said reference frequency by said subharmonic frequency, a filter in said loop circuit following said distorting network for selecting said harmonic frequency and having an output impedance which is high at said harmonic frequency, a high-gain amplifier in said loop circuit between said last mentioned filter and said modulator, and frequency selective output circuits selective respectively of said harmonic frequency and twice said harmonic frequency coupled to said second modulator input circuit.

6. Means for developing from an electrical wave of frequency F a plurality of waves the frequencies whereof are integral multiples of a frequency $f$ where $F=(n+1)f$, $n$ being an integer, comprising a single-balanced modulator having a pair of input terminals for connection to a stable source of waves of frequency F and a second pair of input terminals, an output circuit for said modulator, a first amplifier connected in said output circuit, a plurality of frequency-selective circuits coupled to the output of said amplifier including one selective of the frequency $f$ and one selective of frequency $mf$ where $m$ is an integer other than 1 or $n$, a loop circuit supplied by the circuit selective of the frequency $f$ and including in succession a distorting network for developing a component of frequency $nf$, a filter selective of said component, a high-gain amplifier, and connections from said high-gain amplifier to the second pair of input terminals of said modulator, a branch circuit from said last mentioned connections and a filter in said branch circuit for selecting therefrom waves of frequency $nf$.

7. Apparatus as defined in claim 6 wherein said first-mentioned filter selective of frequency $nf$ has a relatively low input impedance and a relatively high output impedance.

8. Means for developing from an electrical wave of frequency F a plurality of waves the frequencies whereof are integral multiples of a frequency $f$ where $F=(n+1)f$, $n$ being an integer, comprising a single-balanced modulator having a pair of input terminals for connection to a stable source of waves of frequency F and a second pair of input terminals, an output circuit for said modulator, a first amplifier connected in said output circuit, a plurality of frequency-selective circuits coupled to the output of said amplifier including one selective of the frequency $f$ and one selective of frequency $mf$ where $m$ is an integer other than 1 or $n$, a loop circuit supplied by the circuit selective of the frequency $f$ and including in succession a distorting network for developing a component of frequency $nf$, a filter selective of said component, a high-gain amplifier and connections from said high-gain amplifier to the second pair of input terminals of said modulator, an output transformer for said high-gain amplifier, and secondary windings on said transformer connected respectively to the second pair of input terminals of said modulator, an output circuit including a filter selective of frequency $nf$ and a filter selective of frequency $2nf$.

References Cited in the file of this patent

UNITED STATES PATENTS

| | | |
|---|---|---|
| 2,159,596 | Miller | May 23, 1939 |
| 2,459,822 | Lalande | Jan. 25, 1949 |